US012579097B2

(12) United States Patent　　　　　(10) Patent No.: US 12,579,097 B2
Zhao et al.　　　　　　　　　　　　　(45) Date of Patent: Mar. 17, 2026

(54) INTER-NODE COMMUNICATION METHOD AND APPARATUS, ELECTRONIC DEVICE, AND STORAGE MEDIUM

(71) Applicant: SUZHOU METABRAIN INTELLIGENT TECHNOLOGY CO., LTD., Suzhou (CN)

(72) Inventors: Qianqian Zhao, Suzhou (CN); Hongwei Kan, Suzhou (CN); Rui Hao, Suzhou (CN); Linge Xiao, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/123,006

(22) PCT Filed: Feb. 27, 2024

(86) PCT No.: PCT/CN2024/078825
§ 371 (c)(1),
(2) Date: Apr. 21, 2025

(87) PCT Pub. No.: WO2024/244557
PCT Pub. Date: Dec. 5, 2024

(65) Prior Publication Data
US 2026/0010511 A1　　　Jan. 8, 2026

(30) Foreign Application Priority Data

Jun. 1, 2023　　(CN) ......................... 202310640711.4

(51) Int. Cl.
G06F 15/173　　　(2006.01)
G06F 9/455　　　(2018.01)
H04L 67/1097　　　(2022.01)

(52) U.S. Cl.
CPC .... G06F 15/17331 (2013.01); G06F 9/45558 (2013.01); H04L 67/1097 (2013.01); G06F 2009/45595 (2013.01)

(58) Field of Classification Search
CPC ........... G06F 15/17331; G06F 9/45558; G06F 2009/45595; G06F 13/12; G06F 8/65; G06F 9/5044; G06F 9/5055; H04L 67/1097; H04L 67/10
See application file for complete search history.

(56) References Cited

U.S. PATENT DOCUMENTS

2015/0039793 A1　　2/2015　Rossetti
2021/0294702 A1　　9/2021　Guim Bernat et al.
(Continued)

FOREIGN PATENT DOCUMENTS

CN　　　110727499 A　　　1/2020
CN　　　112395040 A　　　2/2021
(Continued)

OTHER PUBLICATIONS

Wang, et al., "FPGANic: An FPGA-based Versatile 100Gb SmartNIC for GPUs", Jul. 2022.*
(Continued)

*Primary Examiner* — Todd L Barker
(74) *Attorney, Agent, or Firm* — IPro, PLLC

(57) ABSTRACT
The present disclosure provides a method for communication between nodes. The method includes: obtaining a list of field-programmable gate arrays; virtualizing the field-programmable gate arrays according to the list of field-programmable gate arrays to obtain a first source node and a first target node; obtaining an application descriptor between the first source node and the first target node, the application descriptor includes a memory address of the first source node and a memory address of the first target node; obtaining an identity document of the first source node according to the memory address, and obtaining an identity document
(Continued)

of the first target node according to the memory address; and performing a communication action on the first source node and the first target node through a remote direct memory access module according to the identity document of the first source node and the identity document of the first target node.

19 Claims, 8 Drawing Sheets

(56) References Cited

U.S. PATENT DOCUMENTS

| | | | | |
|---|---|---|---|---|
| 2022/0206839 A1 * | 6/2022 | Alsop | ................. | G06F 12/0284 |
| 2022/0206864 A1 * | 6/2022 | Nadathur | .................. | G06F 8/63 |
| 2022/0261178 A1 | 8/2022 | He et al. | | |

FOREIGN PATENT DOCUMENTS

| | | | |
|---|---|---|---|
| CN | 113674133 A | 11/2021 |
| CN | 114050998 A | 2/2022 |
| CN | 114445260 A | 5/2022 |
| CN | 115037551 A | 9/2022 |
| CN | 115904675 A | 4/2023 |
| CN | 116383127 A | 7/2023 |

OTHER PUBLICATIONS

Le et al., UNO: uniflying host and smart NIC offload for flexible packet processing, Sep. 2017.*

Grant et al., "SmartNIC Performance Isolation with FairNIC: Programmable Networking for the Cloud,", Jul. 2020.*

* cited by examiner

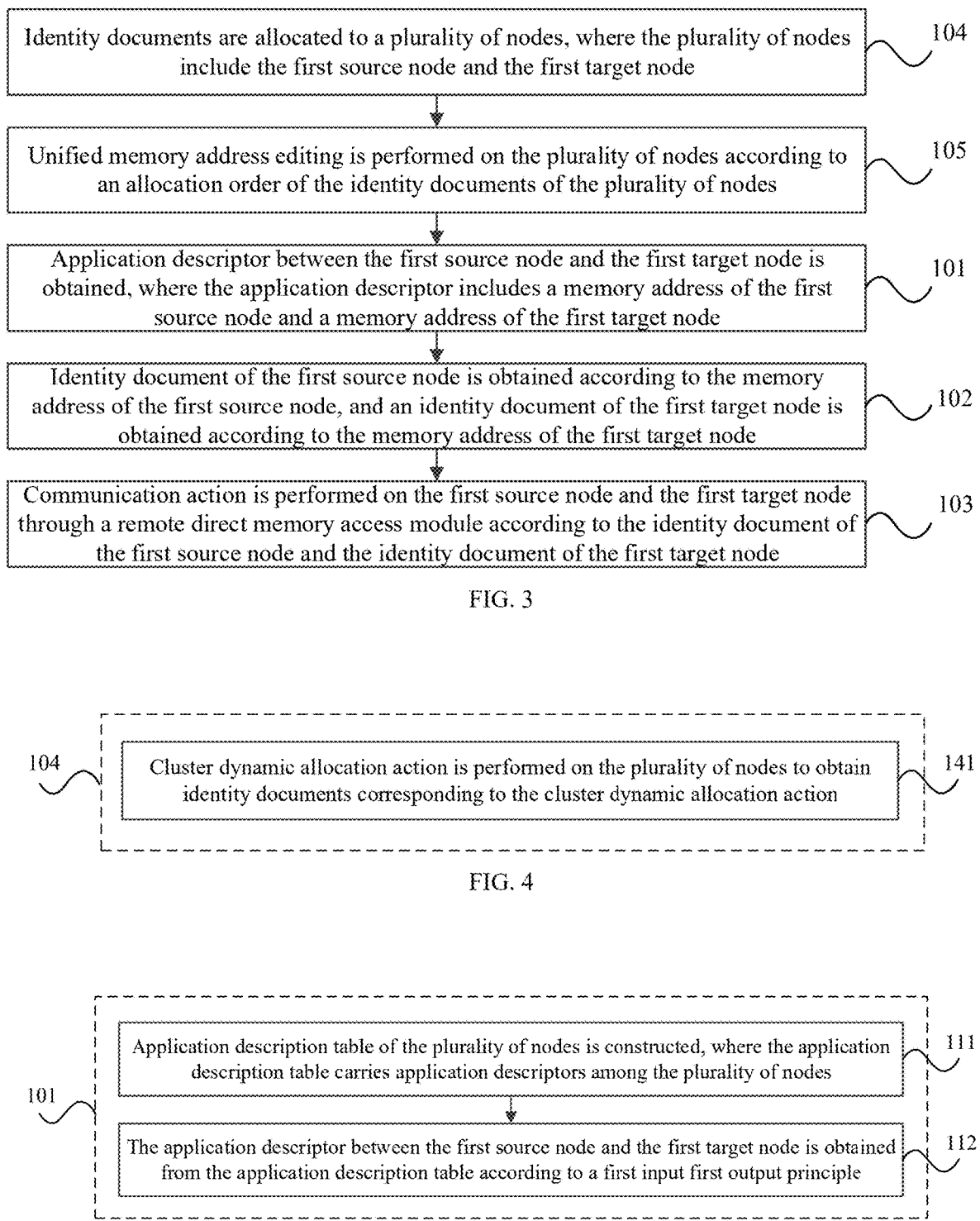

Identity documents are allocated to a plurality of nodes, where the plurality of nodes include the first source node and the first target node    104

Unified memory address editing is performed on the plurality of nodes according to an allocation order of the identity documents of the plurality of nodes    105

Application descriptor between the first source node and the first target node is obtained, where the application descriptor includes a memory address of the first source node and a memory address of the first target node    101

Identity document of the first source node is obtained according to the memory address of the first source node, and an identity document of the first target node is obtained according to the memory address of the first target node    102

Communication action is performed on the first source node and the first target node through a remote direct memory access module according to the identity document of the first source node and the identity document of the first target node    103

FIG. 3

104    Cluster dynamic allocation action is performed on the plurality of nodes to obtain identity documents corresponding to the cluster dynamic allocation action    141

Application description table of the plurality of nodes is constructed, where the application description table carries application descriptors among the plurality of nodes    111

The application descriptor between the first source node and the first target node is obtained from the application description table according to a first input first output principle    112

FIG. 5

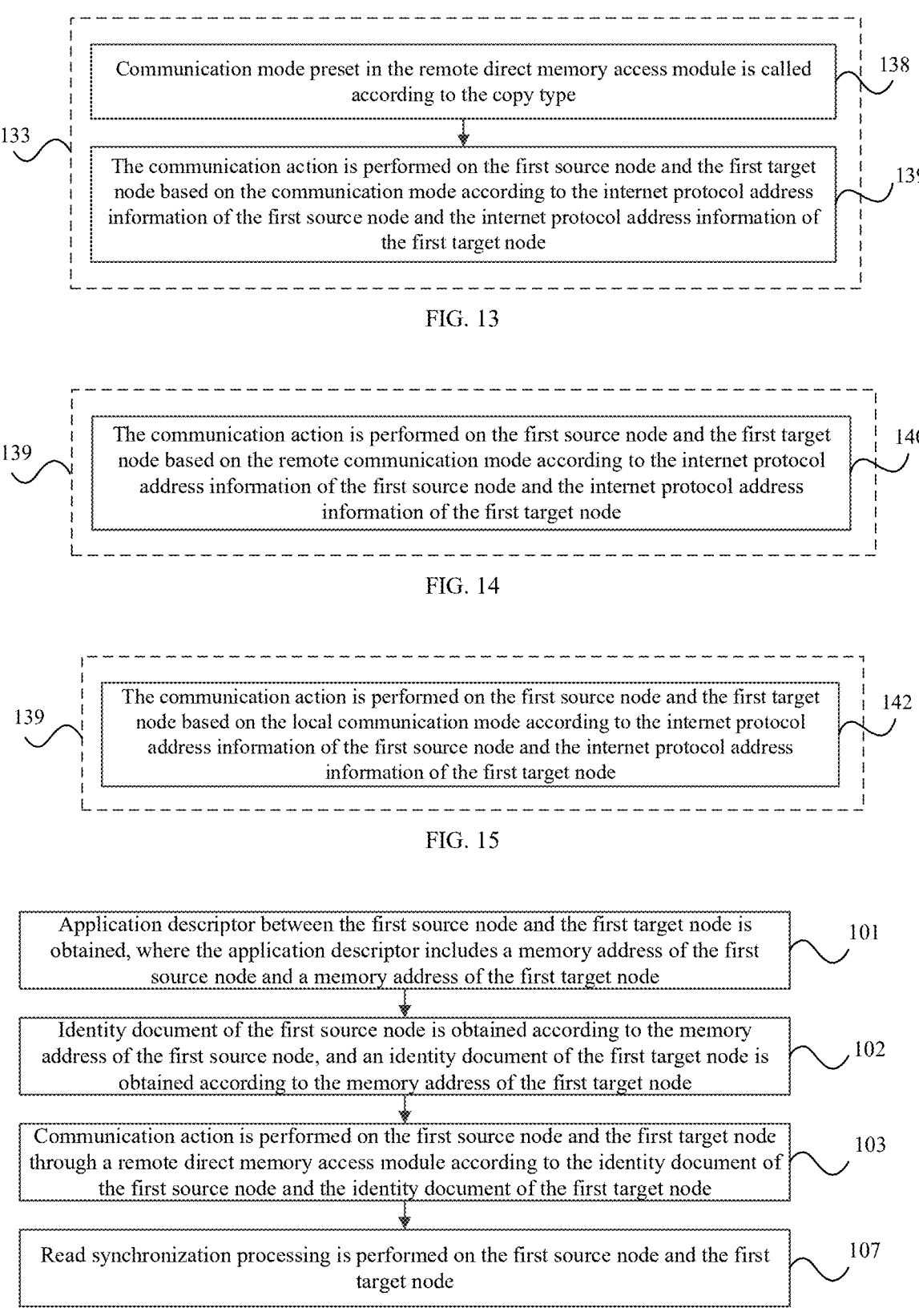

Communication mode preset in the remote direct memory access module is called according to the copy type

133

138

The communication action is performed on the first source node and the first target node based on the communication mode according to the internet protocol address information of the first source node and the internet protocol address information of the first target node

The communication action is performed on the first source node and the first target node based on the remote communication mode according to the internet protocol address information of the first source node and the internet protocol address information of the first target node

The communication action is performed on the first source node and the first target node based on the local communication mode according to the internet protocol address information of the first source node and the internet protocol address information of the first target node

Application descriptor between the first source node and the first target node is obtained, where the application descriptor includes a memory address of the first source node and a memory address of the first target node

101

Identity document of the first source node is obtained according to the memory address of the first source node, and an identity document of the first target node is obtained according to the memory address of the first target node

102

Communication action is performed on the first source node and the first target node through a remote direct memory access module according to the identity document of the first source node and the identity document of the first target node

103

Read synchronization processing is performed on the first source node and the first target node

213    Field-programmable Gate Array List Obtaining Module

214    Node Virtualization Module

201    First Application Description Obtaining Module

202    Identity Document Obtaining Module

203    Communication Action Module

161

Processor

162

Memory

INTER-NODE COMMUNICATION METHOD AND APPARATUS, ELECTRONIC DEVICE, AND STORAGE MEDIUM

CROSS-REFERENCE TO RELATED APPLICATION

The present disclosure claims the priority of Chinese patent application filed on Jun. 1, 2023 before the CNIPA, China National Intellectual Property Administration with the application number of 202310640711.4, and the title of "METHOD AND APPARATUS FOR COMMUNICATION BETWEEN NODES, ELECTRONIC DEVICE, AND STORAGE MEDIUM", which is incorporated herein in its entirety by reference.

FIELD

The present disclosure relates to the field of computer technologies, and more particularly to a method and an apparatus for communication between nodes, an electronic device and a non-transitory readable storage medium.

BACKGROUND

With the emergence of large-scale clusters and super large-scale clusters, the difficulty of cluster management has increased exponentially, and more and more users choose cluster management tools to manage clusters. Existing cluster management tools are often deployed by container technologies. In this deployment method, a single graphics processing unit (GPU) can only be occupied by one container, resulting in the waste of chip computing power of the GPU.

In view of the above problem, the related art often adopts virtualization technologies to share GPU resources among a plurality of different containers. However, a plurality of virtual graphics processing unit (VGPU) containers also need a plurality of networks for communication, and these networks for communication need the participation of a central processing unit (CPU). When processing complex tasks, the CPU is seriously occupied by the communication between different containers for a long time, resulting in poor communication processing capability.

SUMMARY

The present disclosure provides a method and an apparatus for communication between nodes, an electronic device and a non-transitory readable storage medium. In the method for communication between nodes provided by the present disclosure, an identity document of a first source node and an identity document of a first target node are determined by carrying memory information of the first source node and memory information of the first target node, and a communication action is performed on the first source node and the first target node through a remote direct memory access (RDMA) module according to the identity document of the first source node and the identity document of the first target node. Since the method for communication between nodes provided by the present disclosure relies on the RDMA module to perform the communication action between the first source node and the first target node, the CPU is not required to participate, thereby avoiding the problem that the CPU is occupied by the communication between nodes for a long time, and improving the efficiency of the communication between nodes.

In a first aspect, the present disclosure provides a method for communication between nodes, including:

obtaining a list of field-programmable gate arrays;

virtualizing the field-programmable gate arrays according to the list of field-programmable gate arrays to obtain a first source node and a first target node, where the first source node and the first target node are general purpose computing on graphics processing unit nodes;

obtaining an application descriptor between the first source node and the first target node, where the application descriptor includes a memory address of the first source node and a memory address of the first target node;

obtaining an identity document of the first source node according to the memory address of the first source node, and obtaining an identity document of the first target node according to the memory address of the first target node; and performing a communication action on the first source node and the first target node through a remote direct memory access module according to the identity document of the first source node and the identity document of the first target node.

In some embodiments, the method provided by the present disclosure further includes:

allocating identity documents to a plurality of nodes, where the plurality of nodes include the first source node and the first target node; and performing unified memory address editing on the plurality of nodes according to an allocation order of the identity documents of the plurality of nodes.

In some embodiments, the method provided by the present disclosure further includes:

performing a cluster dynamic allocation action on the plurality of nodes to obtain identity documents corresponding to the cluster dynamic allocation action.

In some embodiments, the method provided by the present disclosure further includes:

constructing an application description table of the plurality of nodes, where the application description table carries application descriptors among the plurality of nodes; and obtaining the application descriptor between the first source node and the first target node from the application description table according to a first input first output principle.

In some embodiments, the method provided by the present disclosure further includes:

performing address resolution on the memory address of the first source node to obtain a local address of the first source node and the identity document of the first source node; and performing address resolution on the memory address of the first target node to obtain a local address of the first target node and the identity document of the first target node.

In some embodiments, the method provided by the present disclosure further includes:

generating mapping and demapping between memory addresses of the plurality of nodes with local addresses corresponding to the memory addresses.

In some embodiments, the method provided by the present disclosure further includes:

obtaining internet protocol address information of the first source node according to the identity document of the first source node;

obtaining internet protocol address information of the first target node according to the identity document of the first target node; and performing the communication action on the first source node and the first target node based on a protocol preset in the remote direct memory access module according to the internet protocol address information of the first source node and the internet protocol address information of the first target node.

In some embodiments, the method provided by the present disclosure further includes:

generating mapping between identity documents of the plurality of nodes with internet protocol address information corresponding to the identity documents.

In some embodiments, the method provided by the present disclosure further includes:

performing a zero-copy action on the first source node and the first target node based on the protocol preset in the remote direct memory access module according to the internet protocol address information of the first source node and the internet protocol address information of the first target node.

In some embodiments, the method provided by the present disclosure further includes:

performing a memory read/write action on the first source node and the first target node based on the transmission control protocol preset in the remote direct memory access module according to the internet protocol address information of the first source node and the internet protocol address information of the first target node.

In some embodiments, the method provided by the present disclosure further includes:

performing a memory read/write action on the first source node and the first target node based on the user datagram protocol preset in the remote direct memory access module according to the internet protocol address information of the first source node and the internet protocol address information of the first target node.

In some embodiments, the method provided by the present disclosure further includes:

calling a communication mode preset in the remote direct memory access module according to the copy type; and performing the communication action on the first source node and the first target node based on the communication mode according to the internet protocol address information of the first source node and the internet protocol address information of the first target node.

In some embodiments, the method provided by the present disclosure further includes:

performing the communication action on the first source node and the first target node based on the remote communication mode according to the internet protocol address information of the first source node and the internet protocol address information of the first target node.

In some embodiments, the method provided by the present disclosure further includes:

performing the communication action on the first source node and the first target node based on the local communication mode according to the internet protocol address information of the first source node and the internet protocol address information of the first target node.

In some embodiments, the method provided by the present disclosure further includes:

performing read synchronization processing on the first source node and the first target node.

In some embodiments, the method provided by the present disclosure further includes:

performing write synchronization processing on the first source node and the first target node.

In some embodiments, the method provided by the present disclosure further includes:

generating a communication completion signal according to a result of the read synchronization processing and a result of the write synchronization processing; and obtaining an application descriptor between a second source node and a second target node after obtaining the communication completion signal.

In a second aspect, the present disclosure further provides an apparatus for communication between nodes, applied in a Kubernetes (which is an open-source application used to manage containerized applications on a plurality of hosts in a cloud platform) cluster management system, including:

a field-programmable gate array list obtaining module configured to obtain a list of field-programmable gate arrays;

a node virtualization module configured to virtualize the field-programmable gate arrays according to the list of field-programmable gate arrays to obtain a first source node and a first target node;

a first application description obtaining module configured to obtain an application descriptor between the first source node and the first target node, where the application descriptor includes a memory address of the first source node and a memory address of the first target node, and the first source node and the first target node are general purpose computing on graphics processing unit nodes;

an identity document obtaining module configured to obtain an identity document of the first source node according to the memory address of the first source node, and obtaining an identity document of the first target node according to the memory address of the first target node; and a communication action module configured to perform a communication action on the first source node and the first target node through a remote direct memory access module according to the identity document of the first source node and the identity document of the first target node.

In a third aspect, the present disclosure further provides an electronic device, including a processor and a memory, where the memory stores programs or instructions executable on the processor, and the programs or instructions, when executed by the processor, cause the processor to implement the steps of the method for communication between nodes as described in the first aspect.

In a fourth aspect, an embodiment of the present disclosure provides a non-transitory readable storage medium storing a computer program, where the computer program, when executed by a processor, causes the processor to implement the method for communication between nodes as described in the first aspect.

In the method for communication between nodes provided by the present disclosure, the identity document of the first source node and the identity document of the first target node are determined by carrying the memory information of the first source node and the memory information of the first target node, and the communication action is performed on the first source node and the first target node through the RDMA module according to the identity document of the first source node and the identity document of the first target node. Since the method for communication between nodes provided by the present disclosure relies on the RDMA module to perform the communication action between the first source node and the first target node, the CPU is not required to participate, thereby avoiding the problem that the CPU is occupied by the communication between nodes for a long time, and improving the efficiency of the communication between nodes.

The above description is only an overview of technical solutions provided by the present disclosure. In order to understand technical means of the present disclosure more clearly, it can be implemented according to contents of the specification, and in order to make the above and other purposes, features and advantages of the present disclosure more obvious and understandable, specific implementation methods of the present disclosure are listed below.

BRIEF DESCRIPTION OF THE DRAWINGS

One or more embodiments are illustrated by corresponding figures in accompanying drawings, which do not constitute limitations on the embodiments. Elements with the same reference numerals in the accompanying drawings represent similar elements, and unless otherwise specified, the figures in the accompanying drawings do not constitute scale limitations.

FIG. 3 is a schematic diagram of another method for communication between nodes provided in some embodiments of the present disclosure.

FIG. 4 is a schematic diagram of still another method for communication between nodes provided in some embodiments of the present disclosure.

FIG. 5 is a schematic diagram of yet another method for communication between nodes provided in some embodiments of the present disclosure.

FIG. 13 is a schematic diagram of yet another method for communication between nodes provided in some embodiments of the present disclosure.

FIG. 14 is a schematic diagram of yet another method for communication between nodes provided in some embodiments of the present disclosure.

FIG. 15 is a schematic diagram of yet another method for communication between nodes provided in some embodiments of the present disclosure.

FIG. 16 is a schematic diagram of yet another method for communication between nodes provided in some embodiments of the present disclosure.

Figures 17, 18:
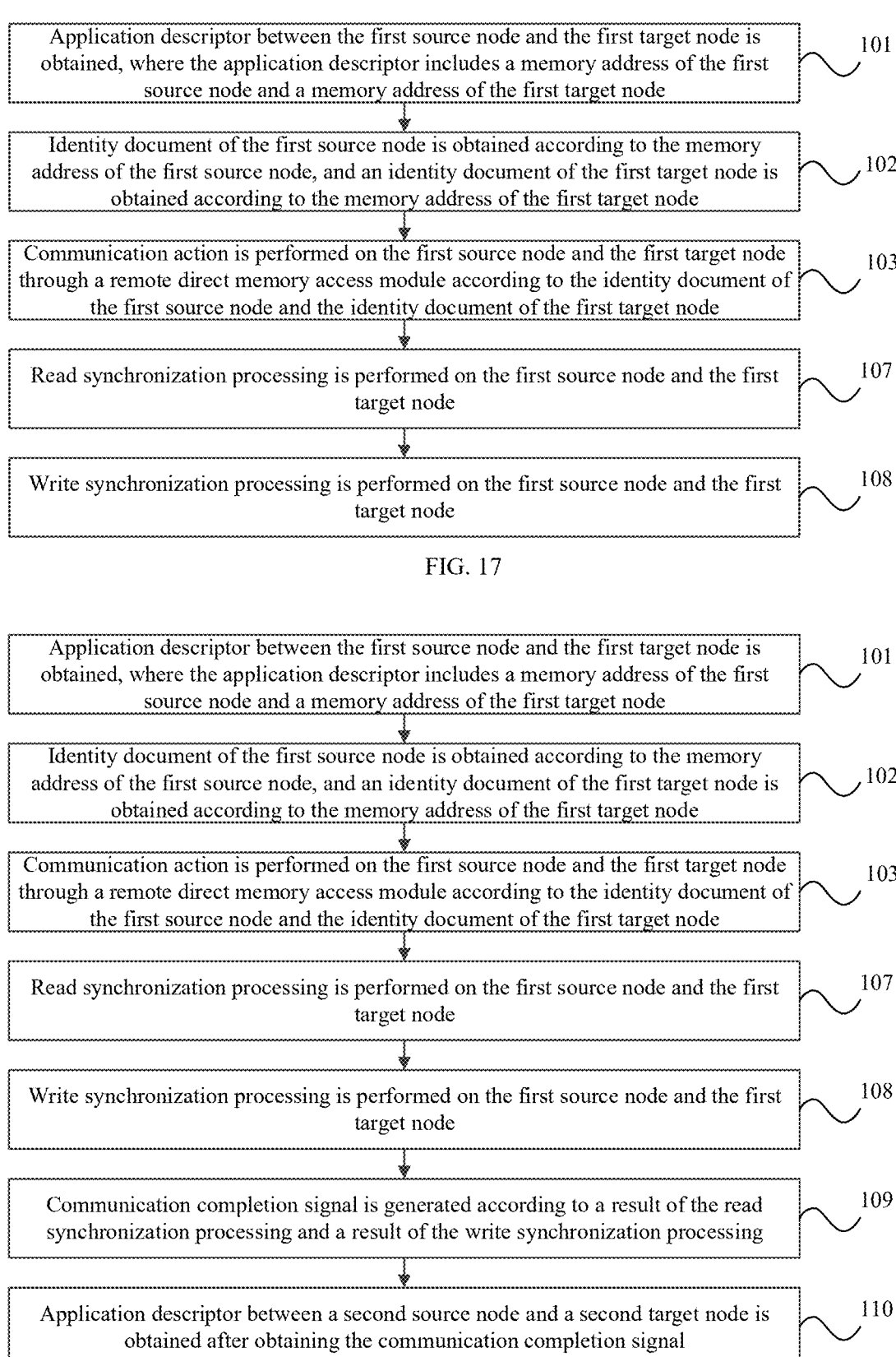

FIG. 17 is a schematic diagram of yet another method for communication between nodes provided in some embodiments of the present disclosure.

FIG. 18 is a schematic diagram of yet another method for communication between nodes provided in some embodiments of the present disclosure.

Figure 19:
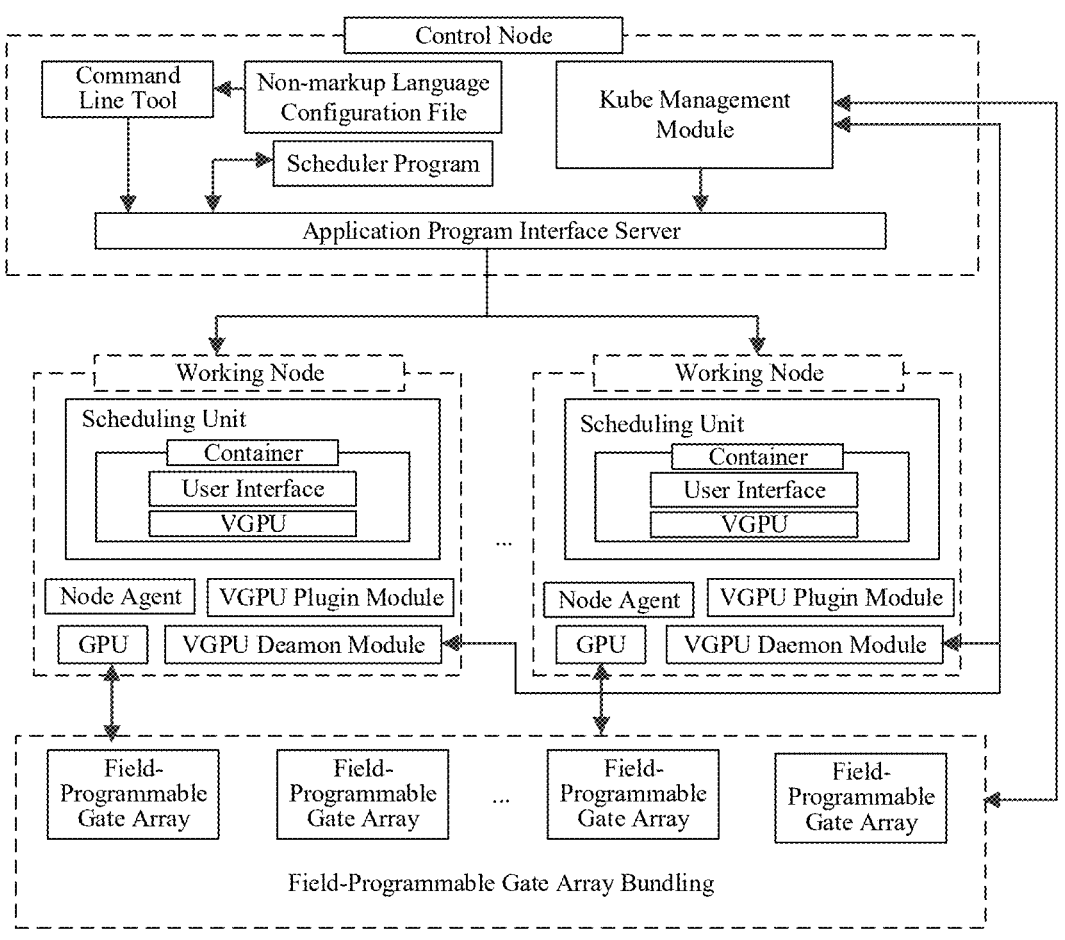

FIG. 19 is a schematic diagram of a distributed cluster construction of a method for communication between nodes provided in some embodiments of the present disclosure.

Figure 20:
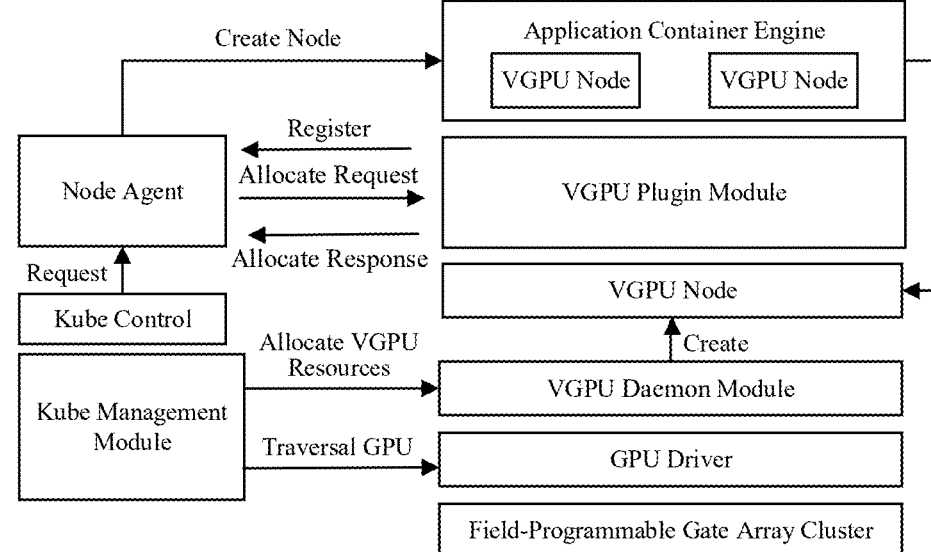

FIG. 20 is a schematic diagram of a distributed cluster construction of another method for communication between nodes provided in some embodiments of the present disclosure.

Figure 21:
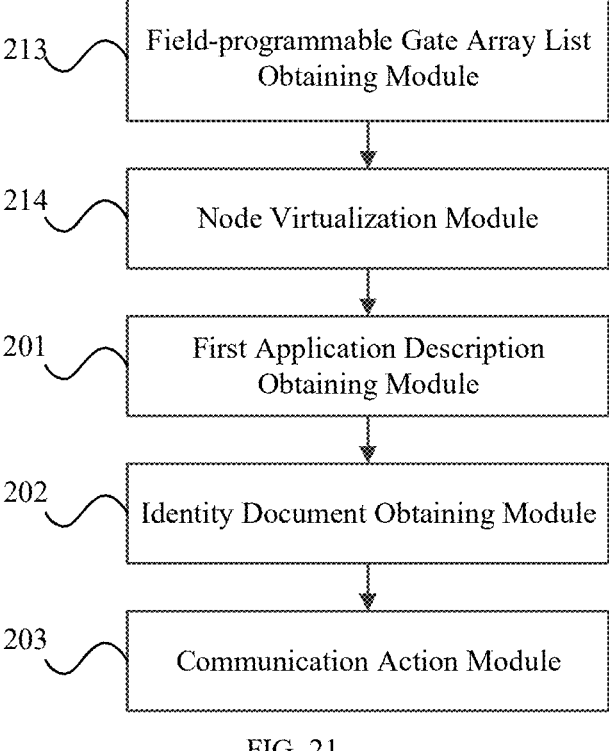

FIG. 21 is a schematic diagram of an apparatus for communication between nodes provided in some embodiments of the present disclosure.

Figure 22:
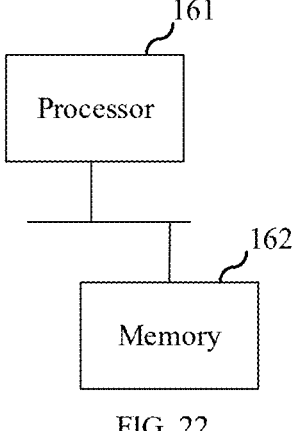

FIG. 22 is a schematic structural diagram of an electronic device provided in some embodiments of the present disclosure.

DETAILED DESCRIPTION

Exemplary embodiments of the present disclosure will be described in more detail below with reference to the accompanying drawings. Although the exemplary embodiments of the present disclosure are shown in the accompanying drawings, it should be understood that the present disclosure can be implemented in various forms and should not be limited by some embodiments set forth herein. On the contrary, these embodiments are provided to enable a more thorough understanding of the present disclosure and to fully convey the scope of the present disclosure to a person skilled in the art.

The terms "first", "second", and the like in the specification and claims of the present disclosure are used to distinguish similar objects, and are not used to describe a specific order or sequence. It should be understood that the data used in this way can be interchanged under appropriate circumstances, so that some embodiments of the present disclosure can be implemented in an order other than those illustrated or described here, and the objects distinguished by "first", "second", and the like are usually one class, and the number of objects is not limited, for example, the first object can be one or more than one. In addition, "and/or" in the specification and claims represents at least one of the connected objects, and the character "/" generally indicates a "or" relationship between the related objects.

The method for communication between nodes provided in embodiments of the present disclosure will be described in detail through specific embodiments and application scenarios with reference to the accompanying drawings.

Figure 1:
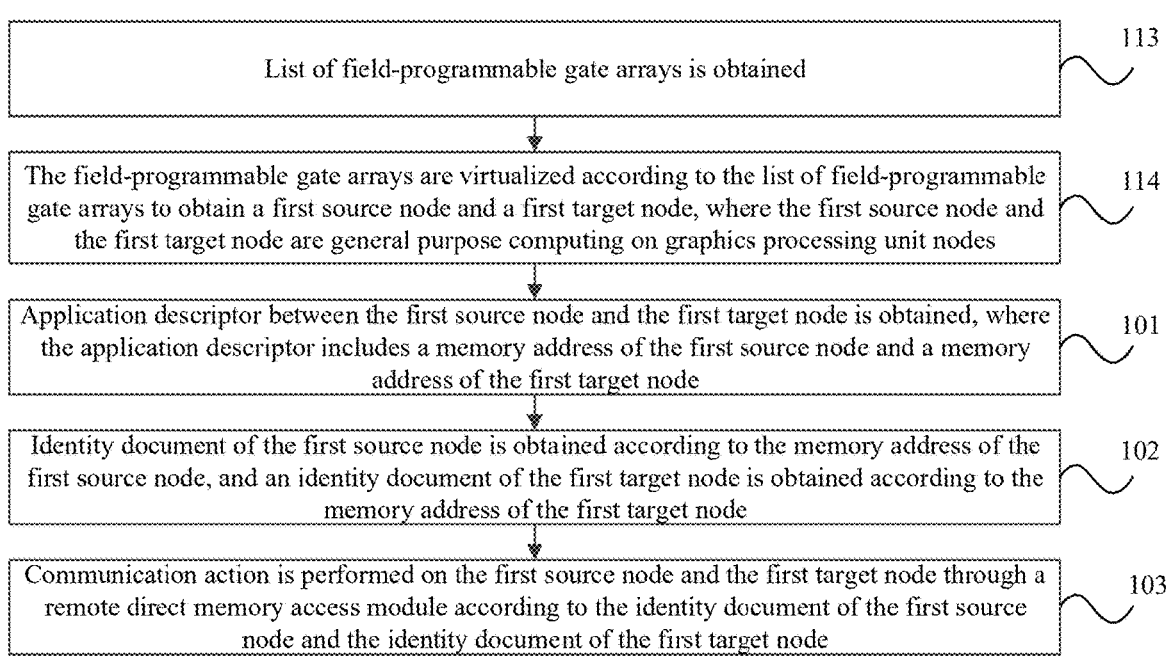
FIG. 1 is a schematic diagram of a method for communication between nodes provided in some embodiments of the present disclosure.

Some embodiments of the present disclosure relate to a method for communication between nodes, applied in a Kubernetes cluster management system. As shown in FIG. 1, the method includes:

step 113, a list of field-programmable gate arrays is obtained;

step 114, the field-programmable gate arrays are virtualized according to the list of field-programmable gate arrays to obtain a first source node and a first target node, where the first source node and the first target node are general purpose computing on graphics processing unit nodes;

step 101, an application descriptor between the first source node and the first target node is obtained, where the application descriptor includes a memory address of the first source node and a memory address of the first target node;

step 102, an identity document of the first source node is obtained according to the memory address of the first source node, and an identity document of the first target node is obtained according to the memory address of the first target node; and step 103, a communication action is performed on the first source node and the first target node through a remote direct memory access module according to the identity document of the first source node and the identity document of the first target node.

In the method for communication between nodes provided by the present disclosure, the Kubernetes cluster management system needs to be constructed in a field-programmable gate array (FPGA) hardware cluster. First, it is necessary to obtain the list of FPGAs. For example, host nodes and FPGA devices in a cluster network can be scanned and an allocation information table of hosts and network graphics processing units (GPUs) are generated. Then, virtual network nodes are created according to the list of FPGAs. When a user initiates a resource request of virtual graphics processing units (VGPUs), new VGPU nodes are created according to resources and required quantity of the VGPUs in the resource request.

Subsequently, the application descriptor between the first source node and the first target node is selected from a descriptor table storing application descriptors. The application descriptor between the first source node and the first target node includes memory address information of the first source node and memory address information of the first target node. Then, address resolution is performed on the memory address of the first source node and the memory address of the first target node in the application descriptor respectively to obtain the identity document of the first source node corresponding to the memory address and the identity document of the first target node corresponding to the memory address. The communication action is performed on the first source node and the first target node according to the identity document of the first source node and the identity document of the first target node, so as to realize information interaction from the first source node to the first target node.

It should be emphasized that for traditional cluster management systems, for example, when remote direct memory access (RDMA) devices are applied in the Kubernetes system, a device plugin mechanism (a mechanism in Kubernetes for device resource management) is often used to facilitate the Kubernetes system to identify and use the RDMA devices; and after identifying the RDMA devices, a complete container network is constructed by reusing a single RDMA network card through a Kubernetes container network interface (CNI, which is a specification and interface for container networks, and defines a set of standard application program interfaces (APIs) and plugins for creating, configuring, and managing networks when containers are running). The first source node and the first target node involved in the present disclosure are both general purpose computing on GPU (GPGPU), compared with the existing form of inserting the GPU and the RDMA network card into a server, the GPGPU provided in the present disclosure is independent of the server. With this design, it is unnecessary to use the existing device plugin mechanism to identify the RDMA devices in the present disclosure, thereby avoiding the participation of a central processing unit (CPU) and saving a lot of server resources. On this basis, a RDMA communication mechanism based on GPGPU nodes provided by the present disclosure, for example, a RDMA communication mechanism based on GPGPU unified addressing, realizes RDMA high-speed communication supporting network GPGPU virtualization.

On the basis of some embodiments, the present disclosure further provides an embodiment of a communication system applying the method for communication between nodes of the present disclosure.

Figure 2:
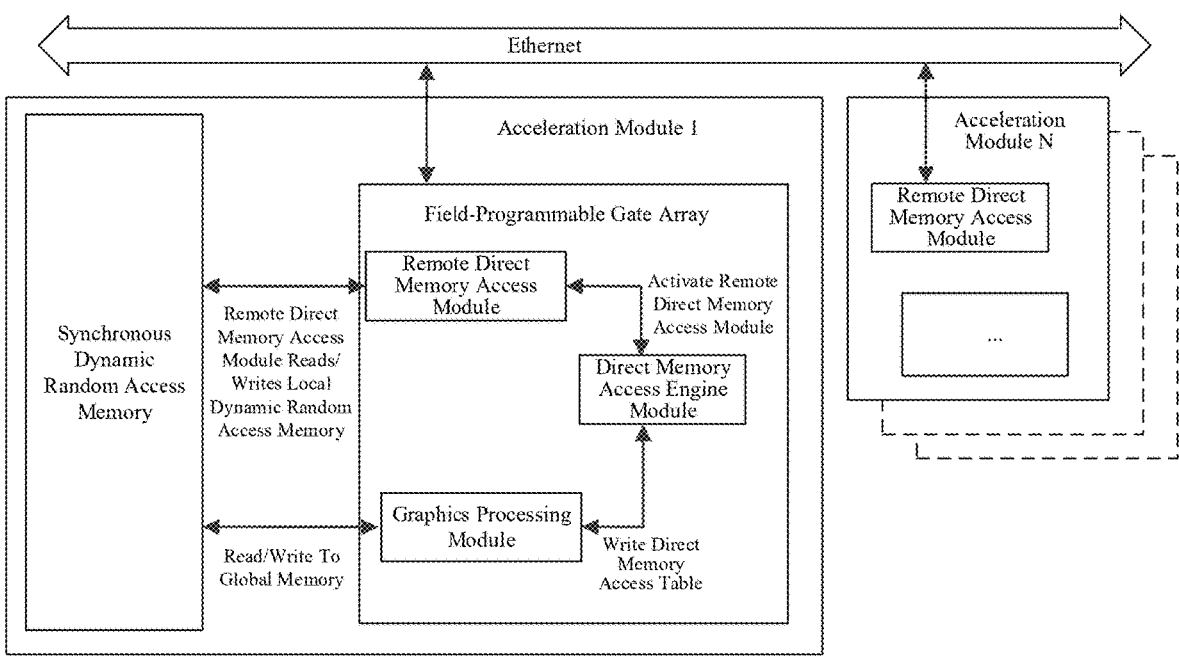
FIG. 2 is an example of a hardware framework of a system for communication between nodes provided by the present disclosure.

The present disclosure provides a system for communication between nodes based on a field-programmable gate array (FPGA). As shown in FIG. 2, a hardware framework of the system includes a plurality of RDMA modules, one or more direct memory access (DMA) engine modules and one or more node modules. Each of the one or more DMA engine modules includes an address resolution module for obtaining identity document according to memory addresses.

The method for communication between nodes provided by the present disclosure is applied to a distributed cluster for realizing node communication functions among a plurality of containers in the distributed cluster. Before executing the communication between nodes, a node upper application of each of the plurality of containers calls a node communication request and keeps an application layer in a blocked state.

When the nodes are a plurality of GPUs, the present disclosure also provides an example of the node communication request. The upper application of VGPU in the container calls a remote communication interface GPU_remote_memcopy, and the communication action of the RDMA module is triggered at this time. For example, the declaration of the GPU_remote_memcopy function is as follows:

```
/*param 1: source GPU memory address, unified memory address
    param 2: target GPU memory address, unified memory address
    param3: copy length*/
int GPU_remote_memcopy (void* src, void* dst, u32t length).
```

The DMA engine module is configured to select an application descriptor between a first source node and a first target node from a descriptor table storing application descriptors, where the application descriptor between the first source node and the first target node includes memory address information of the first source node and memory address information of the first target node. Then, the address resolution module in the DMA engine module respectively performs address resolution on the memory address of the first source node and the memory address of the first target node in the application descriptor to obtain an identity document of the first source node corresponding to the memory address and an identity document of the first target node corresponding to the memory address. The RDMA module performs a communication action on the first source node and the first target node according to the identity document of the first source node and the identity document of the first target node, thereby realizing information interaction from the first source node to the first target node.

After the communication action between the first source node and the first target node is performed, the application layer ends the blocked state and performs subsequent processing according to data obtained by the first target node.

In the method for communication between nodes provided by the present disclosure, the identity document of the first source node and the identity document of the first target node are determined by carrying the memory information of the first source node and the memory information of the first target node, and the communication action is performed on the first source node and the first target node through the RDMA module according to the identity document of the first source node and the identity document of the first target node. Since the method for communication between nodes provided by the present disclosure relies on the RDMA module to perform the communication action between the first source node and the first target node, the CPU is not required to participate, thereby avoiding the problem that the CPU is occupied by the communication between nodes for a long time, and improving the efficiency of the communication between nodes.

In addition, in the method for communication between nodes provided by the present disclosure, data transmission before the container only needs to be copied once, thereby effectively improving the communication efficiency of the communication between nodes.

On the basis of some embodiments, as shown in FIG. 3, in the method for communication between nodes provided by the present disclosure, before step 101, the method further includes:

step 104, identity documents are allocated to a plurality of nodes, where the plurality of nodes include the first source node and the first target node; and step 105, unified memory address editing is performed on the plurality of nodes according to an allocation order of the identity documents of the plurality of nodes.

The method for communication between nodes provided in the present disclosure can be applied to, but is not limited to, a global memory management based on node clusters. Before executing communication among a plurality of nodes, the method for communication between nodes provided by the present disclosure further performs memory address editing on these nodes. First, identity documents (IDs) are allocated to these nodes in the cluster, that is, a unique physical ID is allocated to each node. After allocating physical IDs to all nodes, unified memory address editing is performed on these nodes according to an ID order. An example of the editing is shown in Table 1.

TABLE 1

| Node and Physical Memory Addressing Information Table | | | | | |
|---|---|---|---|---|---|
| ID | 0 | 1 | 2 | . . . | n |
| Memory Address | 0-4G | 4-8G | 8-16G | . . . | . . . |

On the basis of some embodiments, since the method for communication between nodes provided by the present disclosure allocates the identity documents to the plurality of nodes in advance, when performing the communication action between the first source node and the first target node, the user does not need to care about the topology and ID information of the first source node and the first target node, for example, GPGPU, but only needs to consider the address of the first source node and the address of the first target node copied in memory, thereby improving the transparency of remote memory operation and facilitating the user to monitor the execution of the node communication action.

On the basis of some embodiments, as shown in FIG. 4, the plurality of nodes are located in a cluster, and step 104 includes:

step 141, a cluster dynamic allocation action is performed on the plurality of nodes to obtain identity documents corresponding to the cluster dynamic allocation action.

The plurality of nodes provided by the present disclosure are located in the cluster, physical IDs of the plurality of nodes are obtained by performing the cluster dynamic allocation action, and the physical IDs change with the expansion and contraction of the cluster.

On the basis of some embodiments, since the identity documents of the plurality of nodes in the method for communication between nodes provided by the present disclosure are dynamically allocated by the cluster, the user does not need to monitor which node is performing communication interaction, but may determine the node according to the same memory address in real time. Therefore, the operation is transparent and the conversion operation may be determined without modifying the source code.

On the basis of some embodiments, as shown in FIG. 5, in the method for communication between nodes provided by the present disclosure, step 101 includes:

step 111, an application description table of the plurality of nodes is constructed, where the application description table carries application descriptors among the plurality of nodes; and step 112, the application descriptor between the first source node and the first target node is obtained from the application description table according to a first input first output principle.

In the method for communication between nodes provided by the present disclosure, since the RDMA module is shared by nodes in the plurality of containers, it is necessary to perform the communication between nodes for many times, and thus the RDMA module needs to be scheduled, for example, using a queue method, that is, applications need to be made in sequence, and the communication action between nodes that request first is executed first.

Therefore, first, an application description table satisfying a first input first output (FIFO) queue is constructed. Each entry in the application description table is an application descriptor among the plurality of nodes, and each application descriptor carries the memory address of the source node, the memory address of the target node and a copy length. When the upper application of VGPU in the container calls the remote communication interface GPU_remote_memcopy, the earliest application descriptor is retrieved from the application description table according to a first input first output principle, and a source node and a target node of the application descriptor are taken as the first source node and the first target node respectively.

On the basis of some embodiments, since the method for communication between nodes provided by the present disclosure constructs the application description table including the plurality of application descriptors according to the first input first output principle, when obtaining new application descriptors, the new application descriptors are arranged at the end of the queue in the application description table, thereby ensuring that the communication action that submitted the application first is executed first, avoiding the situation that the RDMA processes a plurality of different communication actions at the same time, and improving the communication efficiency.

Figures 6, 7, 8:
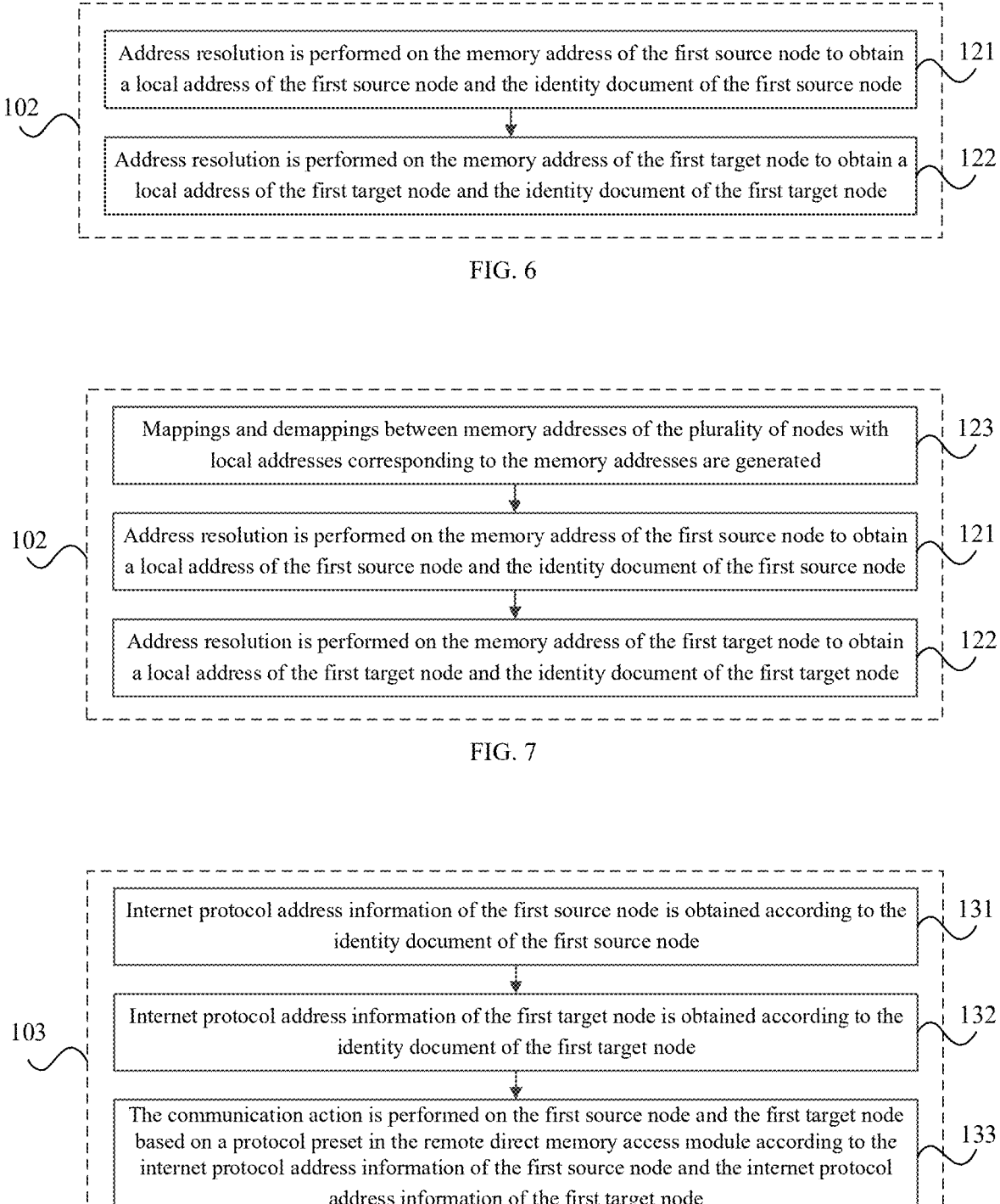
FIG. 6 is a schematic diagram of yet another method for communication between nodes provided in some embodiments of the present disclosure.
FIG. 7 is a schematic diagram of yet another method for communication between nodes provided in some embodiments of the present disclosure.
FIG. 8 is a schematic diagram of yet another method for communication between nodes provided in some embodiments of the present disclosure.

On the basis of some embodiments, as shown in FIG. 6, in the method for communication between nodes provided by the present disclosure, step 102 includes:

step 121, address resolution is performed on the memory address of the first source node to obtain a local address of the first source node and the identity document of the first source node; and step 122, address resolution is performed on the memory address of the first target node to obtain a local address of the first target node and the identity document of the first target node.

The DMA engine module performs address resolution on the memory address of the first source node and the memory address of the first target node to obtain the local address and the identity document of the first source node and the local address and the identity document of the first target node respectively, so that the RDMA module determines an identity document address and an hardware address of the first source node and an identity document address and an hardware address of the first target node according to the identity document of the first source node and the identity document of the first target node.

On the basis of some embodiments, since the method for communication between nodes provided by the present disclosure may obtain the identity document of the first source node and the identity document of the first target node by performing memory address resolution, it is convenient for the RDMA module to obtain internet protocol (IP) address information of the first source node and IP address information of the first target node according to the identity document of the first source node and the identity document of the first target node, and allocate the address resolution action to the DMA engine module other than the RDMA module for implementation, thereby reducing the workload of the RDMA module, improving the working efficiency of the RDMA module, and further improving the communication efficiency of the method for communication between nodes.

On the basis of some embodiments, as shown in FIG. 7, in the method for communication between nodes provided by the present disclosure, before step 121, the method further includes:

step 123, mapping and demapping between memory addresses of the plurality of nodes with local addresses corresponding to the memory addresses are generated.

The address resolution module in the DMA engine module stores mapping and demapping between memory addresses of the plurality of nodes in the cluster with local addresses corresponding to the memory addresses in advance. When the address resolution module in the DMA engine module performs address resolution on the first source node and the first target node, the conversion between the local address and the memory address (for example, the conversion between unified memory addresses) may be performed according to the description information of whether local communication or remote communication is needed in the application descriptor, so as to meet communication requirements in the application descriptor. In addition, an application program interface (API) for converting the local address and the same memory address may be provided for the upper applications, so that the user may convert according to needs.

On the basis of some embodiments, since the method for communication between nodes provided by the present disclosure presets the mapping between the memory addresses of the plurality of nodes with the local addresses corresponding to the memory addresses, it is possible to quickly obtain the corresponding local addresses based on the memory addresses according to the needs of the user, thereby meeting different needs of the user for remote communication or local communication.

On the basis of some embodiments, as shown in FIG. 8, in the method for communication between nodes provided by the present disclosure, step 103 includes:

step 131, internet protocol address information of the first source node is obtained according to the identity document of the first source node;

step 132, internet protocol address information of the first target node is obtained according to the identity document of the first target node; and step 133, the communication action is performed on the first source node and the first target node based on a protocol preset in the remote direct memory access module according to the internet protocol address information of the first source node and the internet protocol address information of the first target node.

After the address resolution module in the DMA engine module obtains the identity document of the first source node and the identity document of the first target node according to the memory address, the RDMA module obtains the internet protocol (IP) address information and hardware address information of the first source node according to the identity document of the first source node, and obtains the IP address information and hardware address information of the first target node according to the identity document of the first target node. Then, the RDMA module performs memory read actions on the remote node based on a preset protocol to realize the communication action between the first source node and the first target node.

On the basis of some embodiments, the method for communication between nodes provided by the present disclosure may perform the communication action based on the protocol preset in the RDMA module according to the IP address information of the first source node and the IP address information of the first target node, thereby ensuring that the RDMA may successfully perform communication actions in different nodes and eliminating the restriction of CPU on the communication between nodes.

Figures 9, 10, 11, 12:
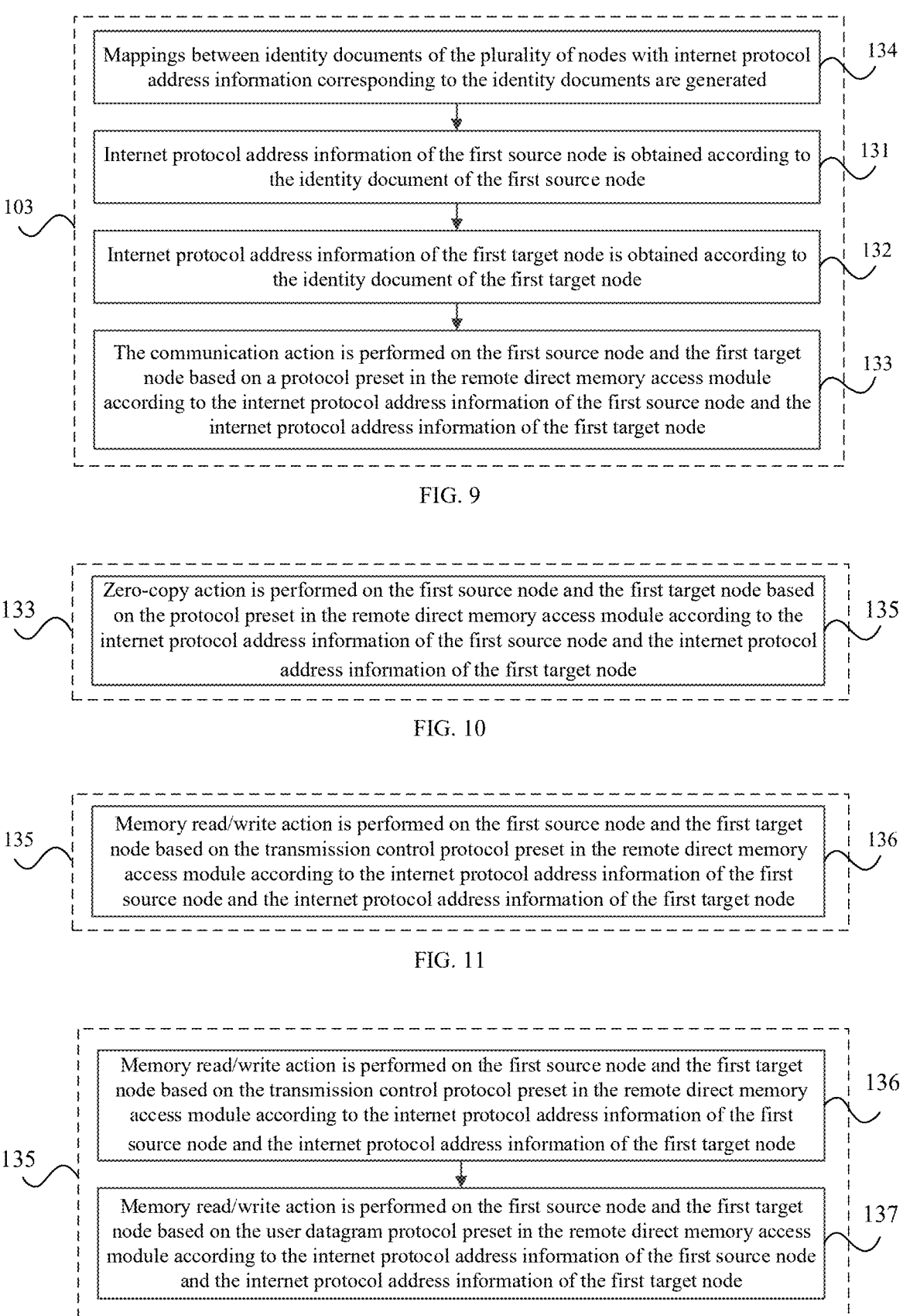
FIG. 9 is a schematic diagram of yet another method for communication between nodes provided in some embodiments of the present disclosure.
FIG. 10 is a schematic diagram of yet another method for communication between nodes provided in some embodiments of the present disclosure.
FIG. 11 is a schematic diagram of yet another method for communication between nodes provided in some embodiments of the present disclosure.
FIG. 12 is a schematic diagram of yet another method for communication between nodes provided in some embodiments of the present disclosure.

On the basis of some embodiments, as shown in FIG. 9, in the method for communication between nodes provided by the present disclosure, before step 131, the method further includes:

step 134, mapping between identity documents of the plurality of nodes with internet protocol address information corresponding to the identity documents are generated.

The RDMA module stores the mapping between the identity documents of the plurality of nodes in the cluster with the internet protocol address information in advance, for example, an IP-ID table. When performing the communicating between the first source node and the first target node, it is convenient for the RDMA module to query the IP address information and the hardware address information of the first source node and the IP address information and the hardware address information of the first target node through the IP-ID table.

On the basis of some embodiments, since the method for communication between nodes provided by the present disclosure presets the mapping between the identity documents of the plurality of nodes with the IP address information corresponding to the identity documents, when performing the communicating between nodes, the RDMA module may quickly obtain the internet protocol information corresponding to the identity documents according to the preset mapping, thereby improving the communication efficiency of the method for communication between nodes.

On the basis of some embodiments, as shown in FIG. 10, the remote direct memory access module shares memory with graphics processing units (GPUs) corresponding to the general purpose computing on graphics processing unit nodes, and in the method for communication between nodes provided by the present disclosure, step 133 includes:

step 135, a zero-copy action is performed on the first source node and the first target node based on the protocol preset in the remote direct memory access module according to the internet protocol address information of the first source node and the internet protocol address information of the first target node.

In some embodiments, the RDMA module shares memory with the GPU, and after obtaining the IP address information of the first source node and the IP address information of the first target node, the RDMA module can directly access GPU memory corresponding to the first source node and the first target node to realize zero-copy.

On the basis of some embodiments, since the RDMA module and the GPU share the memory in the method for communication between nodes provided by the present disclosure, the RDMA module may directly access the GPU memory, thereby realizing zero-copy, reducing information interaction steps and improving the efficiency of communication between nodes.

On the basis of some embodiments, as shown in FIG. 11, the preset protocol includes a transmission control protocol, and in the method for communication between nodes provided by the present disclosure, step 135 includes:

step 136, a memory read/write action is performed on the first source node and the first target node based on the transmission control protocol preset in the remote direct memory access module according to the internet protocol address information of the first source node and the internet protocol address information of the first target node.

The protocol preset in the RDMA module includes a transmission control protocol (TCP). When obtaining the IP address information of the first source node and the IP address information of the first target node, the RDMA module reads and writes the GPU memory corresponding to the first source node and the first target node through the TCP protocol, so as to realize the memory read/write action between the first source node and the first target node.

On the basis of some embodiments, since the protocol provided in the present disclosure includes the TCP protocol, there is provided an example that may realize the communication method of the present disclosure, which improves the universality of the method for communication between nodes provided in the present disclosure.

On the basis of some embodiments, as shown in FIG. 12, the preset protocol includes a user datagram protocol, and in the method for communication between nodes provided by the present disclosure, step 135 further includes:

step 137, a memory read/write action is performed on the first source node and the first target node based on the user datagram protocol preset in the remote direct memory access module according to the internet protocol address information of the first source node and the internet protocol address information of the first target node.

The protocol preset in the RDMA module includes a user datagram protocol (UDP). When obtaining the IP address information of the first source node and the IP address information of the first target node, the RDMA module reads and writes the GPU memory corresponding to the first source node and the first target node through the UDP protocol, so as to realize the memory read/write action between the first source node and the first target node.

On the basis of some embodiments, since the protocol provided in the present disclosure includes the UDP protocol, there is provided an example that may realize the communication method of the present disclosure, which may be applied to many different protocols, and further improves the universality of the method for communication between nodes provided in the present disclosure.

On the basis of some embodiments, as shown in FIG. 13, the application descriptor further includes a copy type, and in the method for communication between nodes provided by the present disclosure, step 133 further includes:

step 138, a communication mode preset in the remote direct memory access module is called according to the copy type; and step 139, the communication action is performed on the first source node and the first target node based on the communication mode according to the internet protocol address information of the first source node and the internet protocol address information of the first target node.

In the method for communication between nodes provided by the present disclosure, the application descriptor not only carries the memory address of the first source node, the memory address of the first target node and the copy length, but also carries the copy type information. The method for communication between nodes provided by the present disclosure may call the corresponding communication mode preset in the RDMA module according to the copy type and perform the corresponding communication action between nodes.

On the basis of some embodiments, since the application descriptor in the method for communication between nodes provided by the present disclosure also carries the copy type, the RDMA module is preset with the corresponding communication mode, so that different communication modes may be started according to user needs and communication requirements, thereby expanding the scope of use of the present disclosure.

On the basis of some embodiments, as shown in FIG. 14, the copy type includes a remote copy, the communication mode includes a remote communication mode, and in the method for communication between nodes provided by the present disclosure, step 139 includes:

step 140, the communication action is performed on the first source node and the first target node based on the remote communication mode according to the internet protocol address information of the first source node and the internet protocol address information of the first target node.

The copy type includes but is not limited to the remote copy, and the remote communication mode is preset in the RDMA module. When the copy type in the application descriptor is the remote copy, the memory address of the first source node and the memory address of the first target node in the application descriptor are unified memory addresses, and the remote communication mode of the RDMA module is called for communication.

On the basis of some embodiments, since the RDMA module provided by the present disclosure is provided with the remote communication mode, the method for communication between nodes provided by the present disclosure may realize remote communication between different nodes, thereby expanding the scope of use of the present disclosure.

On the basis of some embodiments, as shown in FIG. 15, the copy type further includes a local copy, the communication mode further includes a local communication mode, and in the method for communication between nodes provided by the present disclosure, step 139 further includes:

step 142, the communication action is performed on the first source node and the first target node based on the local communication mode according to the internet protocol address information of the first source node and the internet protocol address information of the first target node.

The copy type further includes but is not limited to the local copy, and the local communication mode is preset in the RDMA module. When the copy type in the application descriptor is the local copy, the memory address of the first source node and the memory address of the first target node in the application descriptor are local memory addresses, and the local communication mode of the RDMA module is called for communication.

It should be emphasized that the method for communication between nodes provided in the present disclosure may only perform remote communication according to the copy type carried by the application descriptor, may only perform local communication according to the copy type carried by the application descriptor, or may also perform remote communication and local communication according to the copy type carried by the application descriptor. The order of remote communication and local communication is executed in turn according to the order in which the application descriptor is obtained, and the present disclosure does not restrict it.

On the basis of some embodiments, since the RDMA module provided by the present disclosure is provided with the local communication mode, the method for communication between nodes provided by the present disclosure may realize local communication between different nodes, thereby further expanding the scope of use of the present disclosure.

On the basis of some embodiments, as shown in FIG. 16, the communication action includes a read action, and in the method for communication between nodes provided by the present disclosure, after step 103, the method further includes:

step 107, read synchronization processing is performed on the first source node and the first target node.

In the method for communication between nodes provided by the present disclosure, the communication action includes the read action, the RDMA module and the GPU share memory, and read communication action of the GPU corresponding to the first source node and the first target node is performed by directly accessing the GPU memory. Then, a communication completion signal is sent to the first source node, thereby realizing the synchronous processing effect of read communication.

On the basis of some embodiments, since the method for communication between nodes provided by the present disclosure may perform read synchronization processing after performing the communication between the first source node and the first target node, thereby saving read communication results of the nodes and enhancing the usability of the method for communication between nodes provided by the present disclosure.

On the basis of some embodiments, as shown in FIG. 17, the communication action further includes a write action, and in the method for communication between nodes provided by the present disclosure, after step 107, the method further includes:

step 108, write synchronization processing is performed on the first source node and the first target node.

In the method for communication between nodes provided by the present disclosure, the communication action includes the write action, and the RDMA module performs write communication action of the GPU corresponding to the first source node and the first target node by directly accessing the GPU memory. Then, the first source node is controlled to send a communication completion signal to the first target node, thereby realizing the synchronous processing effect of write communication.

On the basis of some embodiments, since the method for communication between nodes provided by the present disclosure may perform write synchronization processing after performing the communication between the first source node and the first target node, thereby saving write communication results of the nodes and enhancing the usability of the method for communication between nodes provided by the present disclosure.

On the basis of some embodiments, as shown in FIG. 18, in the method for communication between nodes provided by the present disclosure, after step 108, the method further includes:

step 109, a communication completion signal is generated according to a result of the read synchronization processing and a result of the write synchronization processing; and step 110, an application descriptor between a second source node and a second target node is obtained after obtaining the communication completion signal.

After performing the read communication action, the first source node writes 1 to a synchronization register preset on the first source node after receiving the communication completion signal, and sends a transmission completion request to a driver of the system for communication between nodes to interrupt the blocked state of the application layer. After performing the write communication action, the first target node writes 1 to a synchronization register preset on the first target node after receiving the communication completion signal, and sends a transmission completion request to the driver of the system for communication between nodes to interrupt the blocked state of the application layer. After receiving the transmission completion request sent by the first source node or the first target node, the driver of the system for communication between nodes writes 0) to the synchronization register of the node corresponding to the transmission completion request, and sends an instruction to the DMA engine module to obtain the application descriptor between the second source node and the second target node and perform the communication action between the second source node and the second target node.

On the basis of some embodiments, since the method for communication between nodes provided by the present disclosure may continue to perform the communication action between the second source node and the second target node according to the communication completion signal, thereby ensuring that the RDMA module may perform communication actions respectively in sequence based on the communication requests among a plurality of different nodes, and providing a container-based one-to-many communication capability. After performing the communication action between the first source node and the first target node according to the first application descriptor, a communication completion signal is generated, a second application descriptor is obtained from the application descriptor table constructed according to the first input first output principle, and then the second communication action is performed, thereby ensuring that a plurality of different application descriptors for passage are performed in sequence without mutual interference, and improving the stability of the method for communication between nodes.

On the basis of some embodiments, the present disclosure further provides a complete set of method for communication between nodes.

First, a host calls a communication request between a first source node and a first target node, and a system generates an application descriptor. A newly generated application descriptor is filled in the last line of an application description table and enters a queue to wait for a DMA engine module to call. After the DMA engine module takes out the application descriptor from the queue, an address resolution module in the DMA engine module converts a unified memory address of the first source node and a unified memory address of the first target node into ID information of the first source node and ID information of the first target node according to the application descriptor. The RDMA module obtains IP address information and hardware address information through a preset ID-IP table, and reads and writes remote node memory through a TCP protocol or a UDP protocol. For the read communication action, after performing the communication action, the RDMA module sends a completion signal to the first source node to complete the synchronization operation: and for the write communication action, after performing the communication action, the RDMA module controls the first source node to send a completion signal to the first target node to complete the synchronization operation. After receiving the completion signal, the first source node or the first target node writes 1 in a synchronization register corresponding to the node and sends a transmission completion signal to a driver of the system. After receiving the transmission completion signal, the driver writes 0 in the synchronization register corresponding to the node and sends a signal to the DMA engine module. After receiving the signal, the DMA engine module calls the application descriptor between a second source node and a second target node in the application description table, and continues to perform the communication action between nodes.

On the basis of the above embodiments, the present disclosure further provides a specific example of a distributed cluster construction that can realize the method for communication between nodes in the present disclosure, as shown in FIG. 19 and FIG. 20.

As shown in FIG. 19, taking a field-programmable gate array (FPGA) hardware as an example, a plurality of open source instruction set architectures are built inside the FPGA based on a reduced instruction set principle, for example, a reduced instruction set computer V (RISC-V, an open source instruction set architecture based on the reduced instruction set principle) processor, and parallel scheduling modules are added, so as to obtain a many-core GPU through expansion. Different from the existing CPU-FPGA host binding method, the FPGA devices used in the present disclosure are network computing nodes that do not rely on the CPU, and one or more customized RDMA protocol modules are added to a many-core RISC-V.

On the basis of the above FPGA hardware cluster, an open source application container engine is built, for example, a management system based on a docker (an open source application container engine) and a kubernets. The management system includes a kube management module (kube Admin), a VGPU daemon module (VGPU Daemon) and a VGPU plugin module (VGPU plugin).

The kube Admin is a monitoring and management module of a GPU cluster, which is deployed in a cluster control (master) node and is configured to query and schedule a GPU resource list.

The VGPU Daemon is a GPU resource virtualization module, which is deployed at each worker (worker) node and is configured to receive a FPGA list sent by the kube Admin and virtualize FPGAs in a network into GPU local device nodes according to the FPGA list.

The VGPU plugin is a device plugin (device plugin) based on kubernetes, which is deployed in all worker nodes of kubernetes in a form of daemonsets and is configured to report a GPU virtual node state of the node.

The kube Admin is further configured to manage FPGA board information in the cluster, including an identity document (ID) of the FPGA, an internet protocol (IP) address of the FPGA, a media access control (MAC) address of the FPGA, information of a host where FPGA virtualization GPU is located, and VGPU pod (pod is the most basic deployment and management unit in Kubernetes cluster) information. The VGPU Daemon is further configured to create virtual GPU nodes and is responsible for creating new VGPU nodes according to user needs. The VGPU Daemon includes drivers and user mode programs, which run on all worker nodes. The VGPU plugin runs on the worker node, communicates with Kubelet (an agent component on the Kubernetes worker node) through a google remote procedure call (GRPC) service, and is responsible for informing a state of VGPU Node (an endpoint of network connection) in the pod. The communication process between the VGPU plugin and the Kubelet is shown in FIG. 20.

The management system based on the docker and the kubernets can be realized by but not limited to the following methods.

A first step is to build a network GPU cluster. FPGA Admin scans host nodes and FPGA devices in a cluster network, and generates an allocation information table of worker hosts and network GPUs.

A second step is to deploy a VGPU daemon. A request is sent to VGPU Admin to obtain a FPGA list, and then a virtual network GPU node is created according to the FPGA list.

Then, a VGPU plugin is deployed by daemonset. A worker host where the network GPU node is located registers a GRPC service with kubelet and reports a list of network GPU devices. The list of network GPU devices is fed back to a API server by kubelet.

When a user initiates a VGPU resource request. VGPU resources and required quantity are declared in limits field in a profile of kubernetes. The minimum unit of VGPU is a single physical core of RISC-V. At the same time, it is necessary to apply for corresponding VGPU memory Vmemory, and the minimum unit of memory application is GPU memory/risc-v cores. A Kubernetes scheduler module traverses all target nodes and filters out candidate worker nodes that meet the requirements. Kubelet of a target node selects a GPU that meets the required quantity from a local GPU list, and then generates a virtual VGPU node in a driver layer, which contains the number of risc-v cores and the corresponding memory. Kubelet initiates an allocate request to a local VGPU plugin with the VGPU node to be allocated to the container as a parameter. The VGPU plugin receives the allocate request and returns the allocate request to kubelet in the form of an allocate response. Kubelet creates and initializes a container containing specified VPGU resources according to the allocate response. When the distributed cluster is built, it can be applied to the method for communication between nodes provided by the present disclosure.

Some embodiments of the present disclosure relate to apparatus for communication between nodes, applied in a Kubernetes cluster management system, as shown in FIG. 21, including:

a field-programmable gate array list obtaining module 213 configured to obtain a list of field-programmable gate arrays;

a node virtualization module 214 configured to virtualize the field-programmable gate arrays according to the list of field-programmable gate arrays to obtain a first source node and a first target node;

a first application description obtaining module 201 configured to obtain an application descriptor between the first source node and the first target node, where the application descriptor includes a memory address of the first source node and a memory address of the first target node, and the first source node and the first target node are general purpose computing on graphics processing unit nodes;

an identity document obtaining module 202 configured to obtain an identity document of the first source node according to the memory address of the first source node, and obtain an identity document of the first target node according to the memory address of the first target node; and a communication action module 203 configured to perform a communication action on the first source node and the first target node through a remote direct memory access module according to the identity document of the first source node and the identity document of the first target node.

On the basis of some embodiments, the apparatus for communication between nodes provided by the present disclosure further includes:

an identity document allocation module 204 configured to allocate identity documents to a plurality of nodes, where the plurality of nodes include the first source node and the first target node; and an unified memory address editing module 205 configured to perform unified memory address editing on the plurality of nodes according to an allocation order of the identity documents of the plurality of nodes.

On the basis of some embodiments, the plurality of nodes are located in a cluster, and the identity document allocation module 204 provided by the present disclosure includes:

a cluster dynamic allocation unit 241 configured to perform a cluster dynamic allocation action on the plurality of nodes to obtain identity documents corresponding to the cluster dynamic allocation action.

On the basis of some embodiments, the first application description obtaining module 201 provided by the present disclosure includes:

an application description table construction unit 211 configured to construct an application description table of the plurality of nodes, where the application description table carries application descriptors among the plurality of nodes; and an application descriptor obtaining unit 212 configured to obtain the application descriptor between the first source node and the first target node from the application description table according to a first input first output principle.

On the basis of some embodiments, the identity document obtaining module 202 provided by the present disclosure includes:

a source address resolution unit 221 configured to perform address resolution on the memory address of the first source node to obtain a local address of the first source node and the identity document of the first source node; and a target address resolution unit 222 configured to perform address resolution on the memory address of the first target node to obtain a local address of the first target node and the identity document of the first target node.

On the basis of some embodiments, the identity document obtaining module 202 provided by the present disclosure further includes:

a first mapping unit 223 configured to generate mapping and demapping between memory addresses of the plurality of nodes with local addresses corresponding to the memory addresses.

On the basis of some embodiments, the communication action module 203 provided by the present disclosure includes:

a source internet protocol obtaining unit 231 configured to obtain internet protocol address information of the first source node according to the identity document of the first source node;

a target internet protocol obtaining unit 232 configured to obtain internet protocol address information of the first target node according to the identity document of the first target node; and a communication unit 233 configured to perform the communication action on the first source node and the first target node based on a protocol preset in the remote direct memory access module according to the internet protocol address information of the first source node and the internet protocol address information of the first target node.

On the basis of some embodiments, the communication action module 203 provided by the present disclosure further includes:

a second mapping unit 234 configured to generate mapping between identity documents of the plurality of nodes with internet protocol address information corresponding to the identity documents.

On the basis of some embodiments, the nodes are graphics processing units (GPUs), the remote direct memory access module shares memory with the GPUs, and the communication unit 233 provided by the present disclosure further includes:

a zero-copy subunit 235 configured to perform a zero-copy action on the first source node and the first target node based on the protocol preset in the remote direct memory access module according to the internet protocol address information of the first source node and the internet protocol address information of the first target node.

On the basis of some embodiments, the preset protocol includes a transmission control protocol, and the zero-copy subunit 235 provided by the present disclosure includes:

a first read/write subunit 236 configured to perform a memory read/write action on the first source node and the first target node based on the transmission control protocol preset in the remote direct memory access module according to the internet protocol address information of the first source node and the internet protocol address information of the first target node.

On the basis of some embodiments, the preset protocol includes a user datagram protocol, and the zero-copy subunit 235 provided by the present disclosure further includes:

a second read/write subunit 237 configured to perform a memory read/write action on the first source node and the first target node based on the user datagram protocol preset in the remote direct memory access module according to the internet protocol address information of the first source node and the internet protocol address information of the first target node.

On the basis of some embodiments, the communication unit 233 provided by the present disclosure includes:

a communication mode calling subunit 238 configured to call a communication mode preset in the remote direct memory access module according to the copy type; and a communication action execution subunit 239 configured to perform the communication action on the first source node and the first target node based on the communication mode according to the internet protocol address information of the first source node and the internet protocol address information of the first target node.

On the basis of some embodiments, the copy type includes a remote copy, the communication mode includes a remote communication mode, and the communication action execution subunit 239 provided by the present disclosure includes:

a remote copy subunit 240 configured to perform the communication action on the first source node and the first target node based on the remote communication mode according to the internet protocol address information of the first source node and the internet protocol address information of the first target node.

On the basis of some embodiments, the copy type further includes a local copy, the communication mode further includes a local communication mode, and the communication action execution subunit 239 provided by the present disclosure further includes:

a local copy subunit 242 configured to perform the communication action on the first source node and the first target node based on the local communication mode according to the internet protocol address information of the first source node and the internet protocol address information of the first target node.

On the basis of some embodiments, the apparatus for communication between nodes provided by the present disclosure further includes:

a read synchronization processing module 207 configured to perform read synchronization processing on the first source node and the first target node.

On the basis of some embodiments, the apparatus for communication between nodes provided by the present disclosure further includes:

a write synchronization processing module 208 configured to perform write synchronization processing on the first source node and the first target node.

On the basis of some embodiments, the apparatus for communication between nodes provided by the present disclosure further includes:

a communication completion signal module 209 configured to generate a communication completion signal according to a result of the read synchronization processing and a result of the write synchronization processing; and a second application description obtaining module 210 configured to obtain an application descriptor between a second source node and a second target node after obtaining the communication completion signal.

Some embodiments of the present disclosure relate to an electronic device, as shown in FIG. 22, including:

at least one processor 161; and a memory 162 communicating with the at least one processor 161, where the memory 162 stores instructions executable by the at least one processor, and the instructions, when executed by at least one processor 161, cause the at least one processor 161 to implement the method for communication between nodes according to some embodiments of the present disclosure.

The memory is connected to the processor by a bus which can include any number of interconnected buses and bridges. The bus connects one or more processors and various circuits of the memory together. The bus can further connect various other circuits such as peripheral devices, voltage regulators and power management circuits together, which are well known in the art and will not be repeated herein. A bus interface provides an interface between the bus and a transceiver. The transceiver can be one element or a plurality of elements, for example, a plurality of receivers and transmitters, providing a unit configured to communicate with various other apparatus on a transmission medium. Data processed by the processor is transmitted on a wireless medium via an antenna, and further, the antenna further receives the data and transmits the data to the processor.

The processor is configured to manage the bus and general processing, and can further provide various functions, including timing, peripheral interfaces, voltage regulation, power management and other control functions. The memory can be configured to store the data used by the processor when performing operations.

Some embodiments of the present disclosure relate to a non-transitory readable storage medium storing a computer program. The computer program, when executed by a processor, causes the processor to implement the method for communication between nodes according to some embodiments of the present disclosure.

That is, a person skilled in the art can understand that all or part of the steps of the methods in some embodiments can be implemented by a program instructing related hardware. The program is stored in a storage medium and includes several instructions to enable a device (which can be a single chip microcomputer, a chip, and the like) or a processor to perform all or part of the steps of the methods in some embodiments of the present disclosure. The foregoing storage medium includes various media that can store program code, for example, a universal serial bus (USB) flash drive, a removable hard disk, a read-only memory (ROM), a random access memory (RAM), a magnetic disk or an optical disc.

Other implementations of the present disclosure will be apparent to a person skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and various modifications and changes can be made without departing from the scope thereof. The scope of the present disclosure is limited only by the appended claims.

The invention claimed is:

1. A method for communication between nodes, applied in a Kubernetes cluster management system, comprising:

obtaining a list of field-programmable gate arrays;

virtualizing the field-programmable gate arrays according to the list of field-programmable gate arrays to obtain a first source node and a first target node, wherein the first source node and the first target node are general purpose computing on graphics processing unit nodes;

obtaining an application descriptor between the first source node and the first target node, wherein the application descriptor comprises a memory address of the first source node and a memory address of the first target node;

obtaining an identity document of the first source node according to the memory address of the first source node, and obtaining an identity document of the first target node according to the memory address of the first target node; and performing a communication action on the first source node and the first target node through a remote direct memory access module according to the identity document of the first source node and the identity document of the first target node, wherein obtaining the identity document of the first source node according to the memory address of the first source node, and obtaining the identity document of the first target node according to the memory address of the first target node comprises:

performing address resolution on the memory address of the first source node to obtain a local address of the first source node and the identity document of the first source node; and performing address resolution on the memory address of the first target node to obtain a local address of the first target node and the identity document of the first target node.

2. The method according to claim 1, wherein before obtaining the application descriptor between the first source node and the first target node, the method further comprises:

allocating identity documents to a plurality of nodes, wherein the plurality of nodes comprise the first source node and the first target node; and performing unified memory address editing on the plurality of nodes according to an allocation order of the identity documents of the plurality of nodes.

3. The method according to claim 2, wherein the plurality of nodes are located in a cluster, and allocating identity documents to the plurality of nodes comprises:

performing a cluster dynamic allocation action on the plurality of nodes to obtain identity documents corresponding to the cluster dynamic allocation action.

4. The method according to claim 2, wherein obtaining the application descriptor between the first source node and the first target node comprises:

constructing an application description table of the plurality of nodes, wherein the application description table carries application descriptors among the plurality of nodes; and obtaining the application descriptor between the first source node and the first target node from the application description table according to a first input first output principle.

5. The method according to claim 1, wherein before performing address resolution on the memory address of the first source node to obtain the local address of the first source node and the identity document of the first source node, the method further comprises:

generating mapping and demapping between memory addresses of the plurality of nodes with local addresses corresponding to the memory addresses.

6. The method according to claim 1, wherein performing the communication action on the first source node and the first target node through the remote direct memory access module according to the identity document of the first source node and the identity document of the first target node comprises:

obtaining internet protocol address information of the first source node according to the identity document of the first source node;

obtaining internet protocol address information of the first target node according to the identity document of the first target node; and performing the communication action on the first source node and the first target node based on a protocol preset in the remote direct memory access module according to the internet protocol address information of the first source node and the internet protocol address information of the first target node.

7. The method according to claim 6, wherein before obtaining internet protocol address information of the first source node according to the identity document of the first source node, the method further comprises:

generating mapping between identity documents of the plurality of nodes with internet protocol address information corresponding to the identity documents.

8. The method according to claim 6, wherein the remote direct memory access module shares memory with graphics processing units corresponding to the general purpose computing on graphics processing unit nodes, and performing the communication action on the first source node and the first target node based on the protocol preset in the remote direct memory access module according to the internet protocol address information of the first source node and the internet protocol address information of the first target node comprises:

performing a zero-copy action on the first source node and the first target node based on the protocol preset in the remote direct memory access module according to the internet protocol address information of the first source node and the internet protocol address information of the first target node.

9. The method according to claim 8, wherein the preset protocol comprises a transmission control protocol, and performing the zero-copy action on the first source node and the first target node based on the protocol preset in the remote direct memory access module according to the internet protocol address information of the first source node and the internet protocol address information of the first target node comprises:

performing a memory read/write action on the first source node and the first target node based on the transmission control protocol preset in the remote direct memory access module according to the internet protocol address information of the first source node and the internet protocol address information of the first target node.

10. The method according to claim 8, wherein the preset protocol comprises a user datagram protocol, and performing the zero-copy action on the first source node and the first target node based on the protocol preset in the remote direct memory access module according to the internet protocol address information of the first source node and the internet protocol address information of the first target node comprises:

performing a memory read/write action on the first source node and the first target node based on the user datagram protocol preset in the remote direct memory access module according to the internet protocol address information of the first source node and the internet protocol address information of the first target node.

11. The method according to claim 6, wherein the application descriptor further comprises a copy type, and performing the communication action on the first source node and the first target node based on the protocol preset in the remote direct memory access module according to the internet protocol address information of the first source node and the internet protocol address information of the first target node comprises:

calling a communication mode preset in the remote direct memory access module according to the copy type; and performing the communication action on the first source node and the first target node based on the communication mode according to the internet protocol address information of the first source node and the internet protocol address information of the first target node.

12. The method according to claim 11, wherein the copy type comprises a remote copy, the communication mode comprises a remote communication mode, and performing the communication action on the first source node and the first target node based on the communication mode according to the internet protocol address information of the first source node and the internet protocol address information of the first target node comprises:

performing the communication action on the first source node and the first target node based on the remote communication mode according to the internet protocol address information of the first source node and the internet protocol address information of the first target node.

13. The method according to claim 11, wherein the copy type further comprises a local copy, the communication mode further comprises a local communication mode, and performing the communication action on the first source node and the first target node based on the communication mode according to the internet protocol address information of the first source node and the internet protocol address information of the first target node comprises:

performing the communication action on the first source node and the first target node based on the local communication mode according to the internet protocol address information of the first source node and the internet protocol address information of the first target node.

14. The method according to claim 1, wherein the communication action comprises a read action, and after performing the communication action on the first source node and the first target node through the remote direct memory access module according to the identity document of the first source node and the identity document of the first target node, the method further comprises:

performing read synchronization processing on the first source node and the first target node.

15. The method according to claim 14, wherein the communication action further comprises a write action, and after performing the communication action on the first source node and the first target node through the remote direct memory access module according to the identity document of the first source node and the identity document of the first target node, the method further comprises:

performing write synchronization processing on the first source node and the first target node.

16. The method according to claim 15, wherein after performing write synchronization processing on the first source node and the first target node, the method further comprises:

generating a communication completion signal according to a result of the read synchronization processing and a result of the write synchronization processing; and obtaining an application descriptor between a second source node and a second target node after obtaining the communication completion signal.

17. An electronic device, comprising a processor and a memory, wherein the memory stores programs or instructions executable on the processor, and the programs or instructions, when executed by the processor, cause the processor to implement the steps of the method for communication between nodes according to claim 1.

18. A non-transitory readable storage medium storing a computer program, wherein the computer program, when executed by a processor, causes the processor to implement the method for communication between nodes according to claim 1.

19. The electronic device according to claim 17, wherein the processor is further configured to implement the method comprising:

allocating identity documents to a plurality of nodes, wherein the plurality of nodes comprise the first source node and the first target node; and performing unified memory address editing on the plurality of nodes according to an allocation order of the identity documents of the plurality of nodes.

* * * * *